Nov. 21, 1950     M. RUSSENBERGER     2,530,483
HYDRAULIC TESTING MACHINE FOR THE PULSATORY
TESTING OF TEST SPECIMENS
Filed March 21, 1944

INVENTOR:

Max Russenberger
by Sommers & Young
Attorneys

Patented Nov. 21, 1950

2,530,483

UNITED STATES PATENT OFFICE 2,530,483

HYDRAULIC TESTING MACHINE FOR THE PULSATORY TESTING OF TEST SPECIMENS

Max Russenberger, Schaffhausen, Switzerland, assignor to Alfred J. Amsler & Co., Schaffhausen, Switzerland Application March 21, 1944, Serial No. 527,468
In Switzerland May 4, 1943

2 Claims. (Cl. 73—92)

This invention relates to hydraulic testing machines for the pulsatory testing of test specimens.

Testing machines of this kind are known to operate either by action of positive driving means so that the fluctuations of stress are transmitted to the test specimen by mechanical means directly or in indirect manner by hydraulic means via an intermediate member. The applicability of such machines, however, is limited, due to the setting up of inertia effects in their movable masses dependent upon the intensity of testing strain, the amplitude of oscillation and the frequency of testing operations obtainable.

Further, pulsatory devices are known to exist in the form of oscillators operating by resonance effect. In these the test specimen itself forms, as a rule, an elastic member of the oscillator. With pulsatory devices great fluctuations of loading can be obtained but, due to the specific nature of their construction, only small amplitudes of oscillation and relatively small straining can be applied to the test specimen so that these devices serve for effecting only light testing work.

In another known testing machine for pulsatory testing work the oscillatory system is so constructed that to the elastic effect of the oil supply retained in the working cylinder of the machine a further supply of oil is opposed so as to provide a resilient buffer and between the two supplies a reciprocating or revolving mechanical mass is included for functioning as an energy accumulator. The constant of resilience of these oil supplies can be regulated to any desired extent by decreasing or increasing the amount of oil by which means the coefficient of inherent frequency of oscillation of the system can be kept to a certain value. Therefore, the system thus obtained acts as a mass which is retained between two springs, in which arrangement the test specimen is connected in series with one of the springs. The energizing is effected with the aid of known means, for example, by an oscillating drive. The frequency of testing of this system is theoretically not restricted, however, for practical reasons it is limited by the damping effect of the machine and of the test specimen unduly increasing. The frequency of the system is determined by the relation $$\omega = \sqrt{\frac{C}{M}}$$

wherein C designates the resilience or spring constant and M the mass.

Therefore, for maintaining a predetermined frequency the relation $$\frac{C}{M}$$

must be satisfied. C is given by the dimensions of the test specimen and the elastic change of volume of the pressure fluid. In general the value of C will be very high for machines for great and extremely great fluctuating forces, in consequence whereof, the mass M must also be great which requirement, however, can be lived up to only in limited manner for practical reasons. It has thus also been proposed to reduce the value C, for example, by employing additional spring means in form of elastic fluids in order to obviate the necessity for using too great masses. However, in resorting to this measure the amounts of piston travel are increased based on the supposition of equality of forces, so that the losses suffered are increased also in this case. A further proposal consists in multiplying the pressure effect of the mass by means of pistons of different cross sections in a manner similar to the varying of the ratio of forces in static testing machines. As far as testing machines for great or extremely great fluctuating forces are concerned the travel of the relatively small piston would in carrying this proposal into effect become so great relative to the piston cross section that unsurmountable difficulties would arise.

According to the present invention, in a hydraulic testing machine operating by means of resonance effect the above-mentioned drawbacks and difficulties are eliminated. In the machine according to the present invention the mass is provided in an amount as great as required by producing in a tube an oscillating stream of a fluid the fluent body of which in flowing back and forth generates high acceleration pressures which when applied to the piston at an accordingly reduced pressure ratio produce high and extremely high fluctuating forces under quickly varying loadings. By varying the length or the cross section of the elongated tube, the mass applied to the piston of the testing machine at an accordingly reduced ratio can be varied within wide limits. Due to the fact that it is feasible to provide the mass practically in any amount required, the value of the spring constant is not limited in any way. Additional reduction of said constant by resorting to oil cushioning means or the like can be dispensed with for the reason that the test specimen itself is utilised for functioning as a spring means substantially alone. The testing machine according to the present invention can be operated in dependence upon the ascending portion or the apex of the resonance curve.

Several embodiments of the present invention are schematically illustrated by way of example only in the accompanying drawings in which Fig. 1 is a sectional elevational view of a first embodiment representing a testing machine for unidirectional pulsatory tests;

Figure 1:
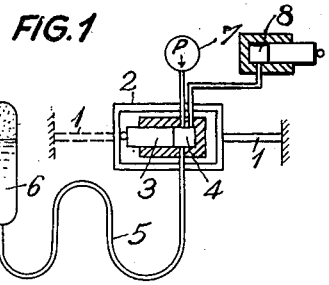

The testing machine, as shown in Fig. 1 in a sectional elevational view, serving for unidirectional pulsatory tests includes an elongated tube which is directly connected with the testing machine cylinder and with a space of constant pressure. The test specimen 1 constitutes the spring means substantially alone which is connected with the piston 3 of the testing machine through the intermediary of a frame 2. The cylinder 4 is in direct communication with the elongated tube 5, the content of which represents the carrier of the mass as well as with a gas expansion space 6. As the pressure fluid any suitable fluid may be used, for example oil. The space 6 serves for creating a continuous counter pressure. For this purpose it is filled with air or with a very elastic fluid so that the spring constant of this filling can be considered as negligible compared with that of the test specimen 1 and that of the testing machine.

For providing a static initial load P a pump 7 known per se is used. By means of a pump piston 8 or the like the system can have forcibly imparted thereto oscillatory motion, so that a reciprocating flow is produced in the oscillatory tube 5 the acceleration pressures of which have exactly the same effect on the piston 3 as if a heavy mass would have been applied to it. The pump piston 8 may be replaced by a centrifugal shaking device for association with the frame 2 without any further provisions. The machine shown in Fig. 1 operates unsymmetrically, that is, either for tensile or compressive tests, the latter if the test bar 1 is connected with the frame 2 in the manner shown in chain lines.

Figure 2:
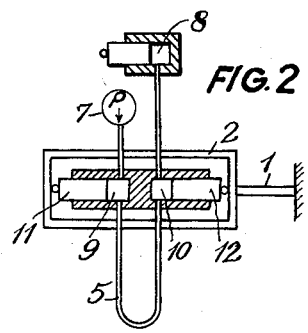
Fig. 2 shows a second embodiment representing a symmetrical testing machine for pulsatory tests in two directions of testing.

In Fig. 2 showing a symmetrical testing machine for pulsatory tests in two directions the elongated tube 5 is connected with both machine cylinders 9 and 10 directly. In this case the elongated tube 5 imparts tensile and compressive strains in alternate succession to the test bar 1. Both pistons 11 and 12 are connected with the frame 2 of the testing machine. The static initial load P is produced by the pump 7, the forced oscillation by the pump piston 8.

Figure 3:
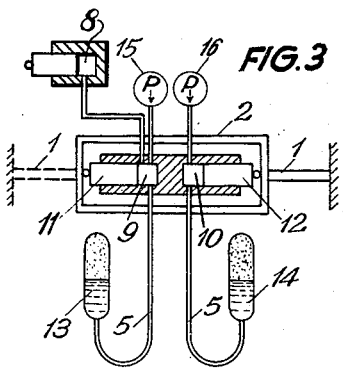
Fig. 3 is a view similar to Fig. 2 of a third embodiment of the invention representing a symmetrical machine for pulsatory testing in one or two directions.

In Fig. 3 showing an embodiment representing an unsymmetrical testing machine for pulsatory tests in one or two directions, each elongated tube 5 is directly separately connected with one of the testing machine cylinders 9 or 10 as well as with one of the two gas expansion spaces. Dependent upon the initial pressures adjusted by means of the pumps 15, 16 the difference of these pressures is transmitted to the test bar 1 as a static tensile or compressive strain, in consequence whereof, unidirectional pulsation testing can also be carried out. If both pumps 15 and 16 are adjusted for producing the same hydraulic pressure the test bar 1 has no initial stressing imparted thereto and it is possible to carry out symmetrical pulsatory tests in both directions. The forcibly generated oscillation is again created by the pump piston 8.

Figure 4:
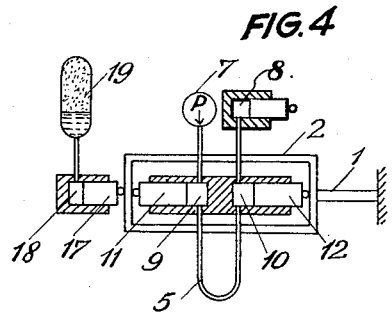
Fig. 4 shows a modification of Fig. 3.

Fig. 4 shows a modification of Fig. 3. In this instance the application of an unsymmetrical testing machine for making pulsatory tests in one or two directions is illustrated. In this machine the elongated tube 5 is connected with both testing machine cylinders 9, 10 directly and apart from this a further pressure loaded piston 17 which is subjected to continuous pressure is provided for operating in a cylinder 18. The latter is connected with a continuous pressure accumulator space by means of which static initial straining of any desired value, for example, compressive straining can be applied to the test bar 1. The two testing machine cylinders 9, 10 are directly connected with the elongated tube 5 in the same manner as in the embodiment shown in Fig. 2. Both testing machine pistons 11, 12 are coupled to the frame 2. The static initial stressing is generated by the pump 7, the forcibly produced oscillation by the pump piston 8.

In adjusting the oscillatory system as to frequency of operation as well as reciprocatory forces it is essential that the mass can be tuned.

Figure 5:
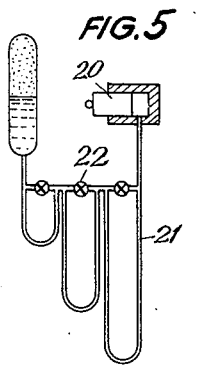
Fig. 5 is a schematic view of means for tuning the oscillatory system.
Figure 6:
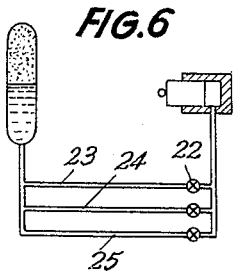
Fig. 6 is a view of a modification of the means shown in Fig. 5.

In connection with Fig. 5 showing a possible mode of tuning of the system it will be understood that with the cross section of the tube remaining constant the amount of mass applied to the piston 20 at an accordingly reduced ratio of pressure becomes so much larger the more the length of the tube amounts to. Consequently, the elongated tube 21 is sub-divided by throttling means, for example, valves 22, whereby the effective length of the elongated tube can be varied. The valves 22 can be opened or closed during the operation by suitable means. With the length of the elongated tube remaining constant, the mass per unit of area of the cross section of the piston varies proportional to the variations of cross section of the tube. This result can thus also be obtained, as shown in Fig. 6, by connecting in parallel several elongated tubes 23, 24 and 25 of equal or different cross sections and lengths.

Figure 7:
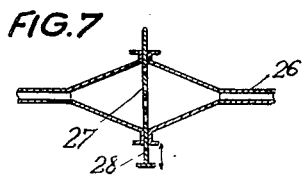
Fig. 7 is a sectional elevational view of means for damping the elongated tube system.

The damping of the elongated tube system can be varied in the most efficient manner by variation of the frictional property of the tubes. In Fig. 7 showing an arrangement of this kind a throttling means 27 is included in the elongated tube 26. This throttling means may be in form of a fixed or adjustable damper 28.

Figure 8:
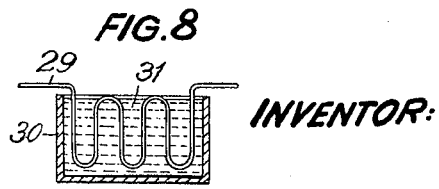
Fig. 8 illustrates a modification of the means shown in Fig. 7 in a sectional elevation.

Further, the friction of the tube can be varied by varying the viscosity of the pressure liquid. Such an arrangement is shown in Fig. 8. The elongated tube 29 passes through a vat 30 which is filled with a heating medium 31. The latter can be heated up to the desired temperature in regulable manner by known means.

The liquid medium contained in the elongated tube can be exchanged for a medium of this kind of a different specific weight in order to permit of varying the mass applied to the machine piston at a reduced pressure ratio. Moreover, as the liquid medium two fluids of different specific weights may be used.

As the liquid medium, for example, a liquid metal can also be used.

I claim:

1. In a hydraulic testing machine for the pulsatory testing of test specimens, a working cylinder, a piston contained in said working cylinder and connected forwardly thereof with the test specimen, a gas expansion chamber, an oscillatory resonant hydraulic system including an elongated tube directly and uninterruptedly connecting said working cylinder rearwardly of said piston to said gas expansion chamber, a fluid in said tube in bearing contact with the rear end surface of said piston, said piston having a greater area than the cross sectional area of said tube, means for generating a reciprocatory flow of said fluid, and means for applying a static initial pressure to the system.

2. In a hydraulic testing machine for the pulsatory testing of test specimens comprising two cylinders working in opposite directions, two pistons each contained in a separate working cylinder and both said pistons connected forwardly thereof with a test specimen by means of an operative connection, a plurality of gas expansion chambers, an oscillatory resonant hydraulic system including two elongated tubes each connecting separately directly and uninterruptedly one of said cylinders rearwardly to the respective piston with a respective gas expansion chamber, a fluid in each of said tubes in bearing contact with the rear end surface of the respective said pistons each having a greater area than the cross sectional area of the associated tube, means for generating a reciprocatory flow of said fluids, and means for applying a static initial pressure to the system.

MAX RUSSENBERGER.

REFERENCES CITED

The following references are of record in the file of this patent:

UNITED STATES PATENTS

| Number | Name | Date |
|---|---|---|
| 2,081,404 | Marx | May 25, 1937 |
| 2,194,914 | Ruch | Mar. 26, 1940 |

FOREIGN PATENTS

| Number | Country | Date |
|---|---|---|
| 637,401 | Germany | Oct. 28, 1936 |
| 480,464 | Great Britain | Feb. 25, 1938 |